Oct. 25, 1927. 1,646,500
J. SIEBER
ADVERTISING SIGN
Filed March 26, 1925   3 Sheets-Sheet 1
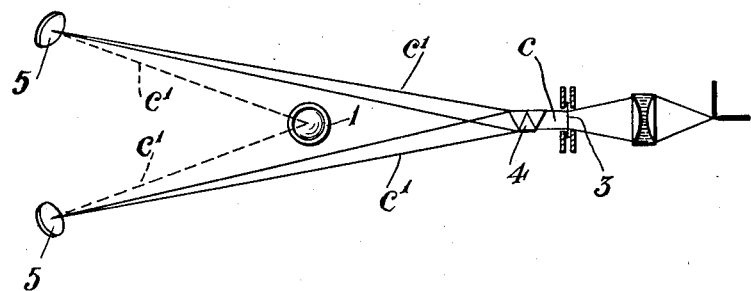
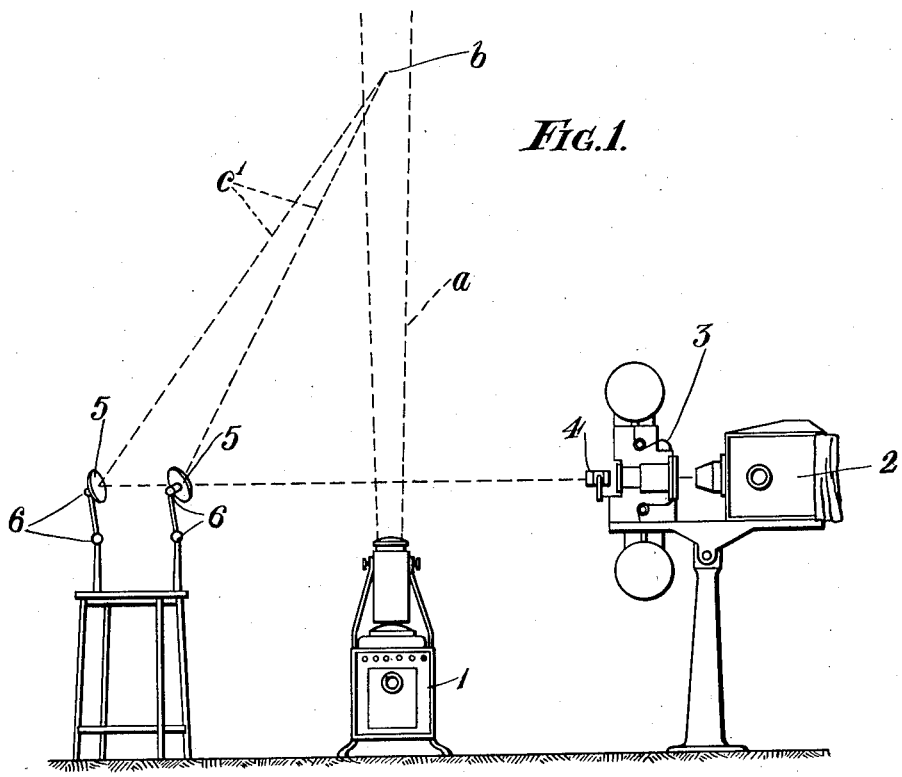

Oct. 25, 1927.
J. SIEBER
1,646,500
ADVERTISING SIGN
Filed March 26, 1925    3 Sheets-Sheet 2
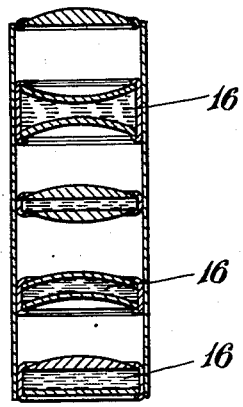
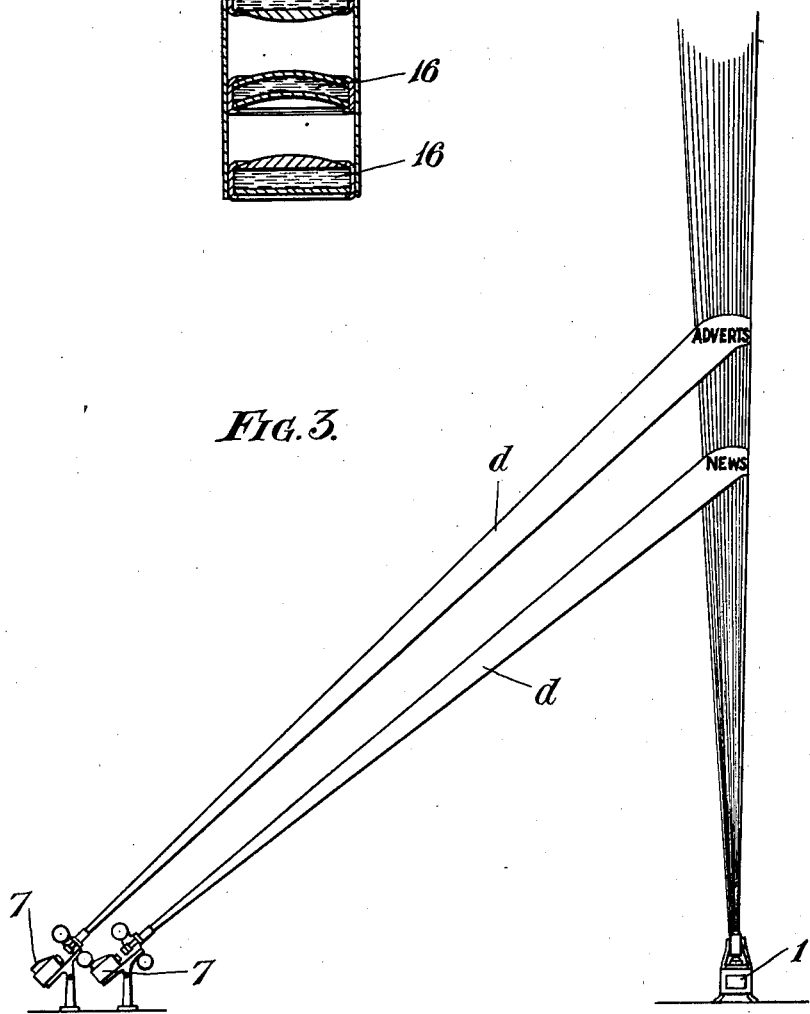
Inventor.
Jacob Sieber
Per.
Attorneys.

Oct. 25, 1927.

J. SIEBER 1,646,500

ADVERTISING SIGN

Filed March 26, 1925   3 Sheets-Sheet 3

Inventor:
Jacob Sieber.
Per: Rayner &
Attorneys.

Patented Oct. 25, 1927.

1,646,500

UNITED STATES PATENT OFFICE.

JACOB SIEBER, OF SIDCUP, ENGLAND, ASSIGNOR, BY MESNE ASSIGNMENTS, TO INTERNATIONAL SKYWRITERS LIMITED, OF TORONTO, CANADA, A COMPANY OF ONTARIO.

ADVERTISING SIGN.

Application filed March 26, 1925, Serial No. 18,409, and in Great Britain June 2, 1924.

My invention relates to a method and apparatus for projecting advertising and other signs into space after daylight and has for its object to enable the projected matter to be visible in space to the normal vision. A further object of my invention is to enable a change in the projected matter to be readily effected as desired, the change if desired having a predetermined frequency.

In carrying my invention into practice, I can employ a strong illuminating projector of the search light type by means of which a beam of light may be projected into the sky in any desired direction. This beam of light is preferably coloured or a dark one and supplementary projecting devices are employed for throwing by means of further beams, images of any desired form of sign onto this beam at an angle, these images being projected in white or pale coloured light. The sign or signs whose image is to be projected on to the coloured or dark beam of light may be in the form of slides, films or other transparencies which may be tinted to produce the desired effect, or monochrome transparencies may be employed in connection with a pale tinted light. The light from the slide, film or other transparency to be projected is preferably split up into two or more beams and directed upon the dark or coloured beam by suitable adjustable reflectors so that the resultant images will conicide or substantially superimpose upon the coloured or dark beam. The images thus projected will be visible to any onlookers and will be seen upon the exterior of the coloured or dark beam projected from the search light.

I prefer to employ a projector of the search light type having an electric arc or other illuminant and suitable colour filters so that it will project a strong beam of coloured light into space in any desired direction. A second projector is arranged with a suitable illuminant to project images of slides, films or other transparencies which may be changed at will either in the manner of a magic lantern or of a kinematograph projector. The transparencies may be projected by white or light coloured light. The beam of light from this second projector is preferably split up into two or more beams by means of prisms, reflectors or other suitable means and these beams of light are directed toward the beam of coloured or dark light issuing from the search light projector so that two or more images are projected across its path at an angle thereto. The image from each reflector will be projected from a different point at angles to each other so that they converge upon the coloured or dark beam of light so as to be substantially superimposed one upon the other on this beam. This will result in a clearly defined image of the transparency which will be visible upon the exterior of the beam of light transmitted from the search light projector.

The different reflectors used for projecting the beams of white light to form the images on the coloured or dark beam may be adjustably mounted both as regards position and angularity, thus enabling the beams to be correctly super-imposed in any desired position on the coloured or dark beam. If desired, the reflectors may be mounted in such a manner that they may be moved so as to cause the super-imposed images to move along the beam of coloured light so that they appear to travel along it. One method of doing this is to first project the white picture beam to a single reflector from which it is split up into two or more beams directed upon separate mirrors which in turn direct them upon the coloured beam. A suitable movement of the first reflector will then cause both of the coloured images to travel simultaneously along the white beam of light.

Advertising or other signs may be conveniently employed in the form of transparencies or lantern slides. These may be suitably coloured or colour screens may be employed to produce images of the desired colour. A movable picture band may also be employed having a series of pictures thereon and adapted to be moved from time to time so as to show different images upon the beam of coloured light.

In a further modification, a kinematograph projector employing an illuminant of sufficient strength may be employed to project a series of images in succession upon the beam of coloured light so as to show moving pictures thereon. My invention may also be employed for the announcement of news items by projecting images of words on to the beam of coloured light so that they may be read by any onlookers. If desired the main beam of light from the search light may be white or light in colour, whilst the pictures or signs may be projected in coloured lights, this being the converse to the method already described. Contrasting colours may also be employed for the search light beam and the picture or sign projecting beam or beams.

In order that my invention may be more clearly understood and readily carried into effect, embodiments of same are illustrated somewhat diagrammatically by means of the accompanying three sheets of drawings, wherein:—

Fig. 1 shows diagrammatically a complete apparatus in operation employing separate projectors for the two sets of light beams.

Fig. 2 is a diagrammatic plan view of Fig. 1, illustrating how the projected sign or picture beam is split up into two beams.

Fig. 3 shows diagrammatically another embodiment of my invention.

Fig. 5 is a sectional view of a suitable combination of lenses for projecting a beam of light.

Figure 4:
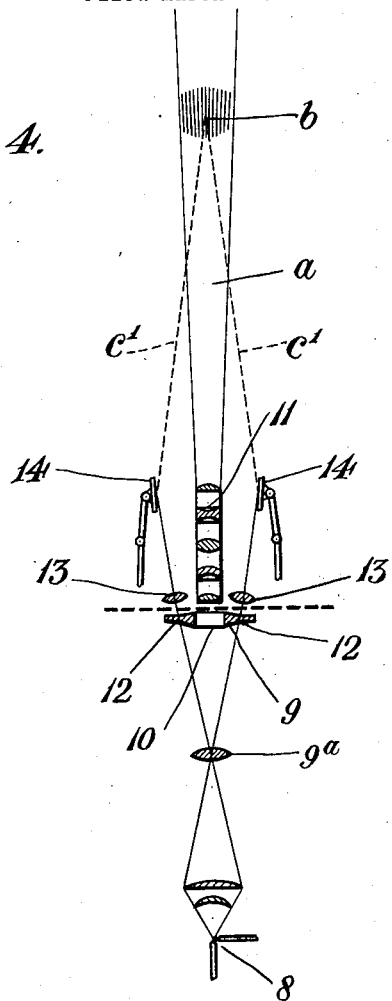
Fig. 4 is a diagrammatic view of a further embodiment of my invention in the form of a combination apparatus employing only one source of light.

Referring to Figs. 1 and 2 of the accompanying drawings a main searchlight or projection lantern 1 is employed for projecting a coloured or dark beam into space, the intensity of the beam being adjustable by any known or suitable device. The projected beam indicated by the reference letter $a$ is adapted to have projected into a suitable point $b$ in its path so as to meet at a common point, two beams of light the axes of which are indicated by the dotted lines $c$. These beams $c$ carry the advertising or other matter, the arrangement being such that two exactly similar advertisements, or whatever is being projected, are correctly superimposed at the point $b$ where the beams meet. The advertising or other matter may be in the form of stencils, transparencies or the like placed in the path of the rays of light projected from the source of light of the beams $c$. The advertising matter, picture or the like will be reproduced at the point in the paths of the beams $c$ where their rays are superimposed on the beam $a$ from the searchlight projector 1 as illustrated in Figs. 1 and 2. The source of light for the beams $c$ is the projection apparatus 2, the advertising matter, pictures or the like may be a suitable stencil or lantern slide, or as shown in the drawings, a kinematograph film 3. The beam of light from the projector 2 is divided into two beams $c^1$, $c^1$ by means of the well known arrangement of prisms 4 shown in Fig. 2, the prisms preferably being such that there is no dispersion of colour.

The two beams $c^1$, $c^1$ are picked up by carefully focused reflectors 5, 5 the angularity of which is adjusted so as to concentrate the beams $c$ on the point $b$ in the path of the beam $a$.

Any suitable means may be provided to adjust the reflectors 5, for instance frictional universal joints 6 may be employed.

In Fig. 3 a pair of beams $d$, $d$ may be projected through the beam $a$ as shown, each beam having its own source of light and projecting apparatus 7 so that separate signs or matter may be projected into space, the intensity of the beams being sufficiently strong to ensure that when they meet the beam $a$, the points in which they meet it are easily discernible, the advertising or other matter being discernible to an extent in proportion to the difference in intensity between the beam $a$ adjacent the points of its intersection with the beams $d$, and the intensity of the light at the points of intersection.

If desired the same source of light may be employed for the beam $a$ and the beams carrying the advertising or other matter, and one way of effecting this is shown in Fig. 4, in which the source of light is indicated by the reference numeral 8. A centrally apertured lens or prism 9 is provided in front of the object lens 9ª so that rays of light near and on the focal axis will pass through the central aperture 10 without refraction and pass through the lenses 11 which are the equivalent of the projector for the beam $a$. Other rays of light pass through lenses 12 forming part of the lens or prism 8, and by means of further lenses 13 are concentrated in symmetrical sets on to reflectors 14 by means of which the resultant beams $c^1$ are concentrated on to a common point $b$ in the beam $a$.

Figure 6:
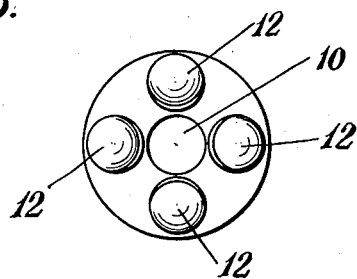
Fig. 6 is a plan view of a suitable form of lens or arrangement of lenses for projecting moving or changing signs or other matter.

A pair of, or more lenses 12 may be employed as shown in Fig. 6. When a pair of these lenses are employed a film 15 may be traversed past them, any suitable gate and shutter mechanism being associated with each lens. Alternatively, slides may be employed having corresponding signs or other matter arranged at points to align with the lenses 12, so that more than a pair of lenses 12 may be employed, each lens having its reflector 14 associated with it. Instead of a single reflector 14 to each lens 12, a series of reflectors 14 may be used, each receiving and reflecting its beam $c^1$ in turn.

The beam $a$ may have any suitable colour by providing a suitable colour filter or filters, and the beams $c$ may have suitable co-operating or contrasting colours so that a colour of greater intensity or more conspicuous is obtained where the various rays meet. Also by changing the colours by any suitable mechanism, the projected matter can be varied in intensity thereby obtaining an attractive or artistic effect. Also when a plurality of separate signs are being projected as in Fig. 3, the beams $c$ could have different colours, and the beam $a$ could have its colour changed successively, so that the different signs are conspicuous, successively, or change colours successively.

It is preferred to cool as many lenses as possible by a suitable liquid or other means.

In Fig. 5 is shown a suitable arrangement of the lenses for the projectors, liquid 16 filling the spaces between the lenses. The liquid may be coloured to provide a suitable colour filter and any desired combination of colours may be provided between the different lenses.

I claim:—

1. In apparatus for projecting a sign or picture into space, means for projecting a plurality of beams of light into space in such directions that they intersect at a common point, one of said beams being of contrasting colour to the other beams, means being provided for projecting by means of these other beams common advertising or other matter and superimposing such common matter at said common point.

2. In apparatus for projecting a sign or picture into space, a source of light, means for concentrating light from such source to form a beam, means for splitting said beam to form a main beam and a series of secondary beams, a transparency representing a sign or picture disposed in said secondary beams, a series of bases for projecting said main beam into space and means for reflecting and projecting said secondary beams on the same point on the main beam.

3. Apparatus for projecting a sign or picture into space according to claim 2 including adjustable reflectors for reflecting and directing said secondary beams onto the main beam.

4. Apparatus for projecting a sign or picture into space according to claim 2 including colour filters for colouring the main beam and including adjustable reflectors for directing said secondary beams onto the main beam.

5. Apparatus for projecting a sign or picture into space according to claim 2 wherein said means for splitting said first mentioned beam comprises an annular lens disposed coaxially with said beam and a series of lenses disposed in the path of the rays which traverse the body of said annular lens.

6. Apparatus for projecting a sign or picture into space according to claim 2 wherein said transparency is a cinematograph film including cinematograph apparatus for successively changing the pictures.

7. In apparatus for projecting a sign or picture into space a source of light, means for concentrating light from such source to form a beam, a lens disposed coaxially with said beam and having a central opening and an annular body portion, a series of lenses co-operating with said central opening to project a main beam into space, a series of lenses co-operating with said annular body portion to form a series of secondary beams, colour filters for colouring said main beam, a transparency representing a sign or picture disposed in said secondary beams and adjustable reflectors for directing said secondary beams onto said main beam.

JACOB SIEBER.